Dec. 21, 1943.   B. G. OLVING   2,337,124
AUTOMATIC ELECTRIC TOASTER
Filed Aug. 29, 1942   4 Sheets-Sheet 2
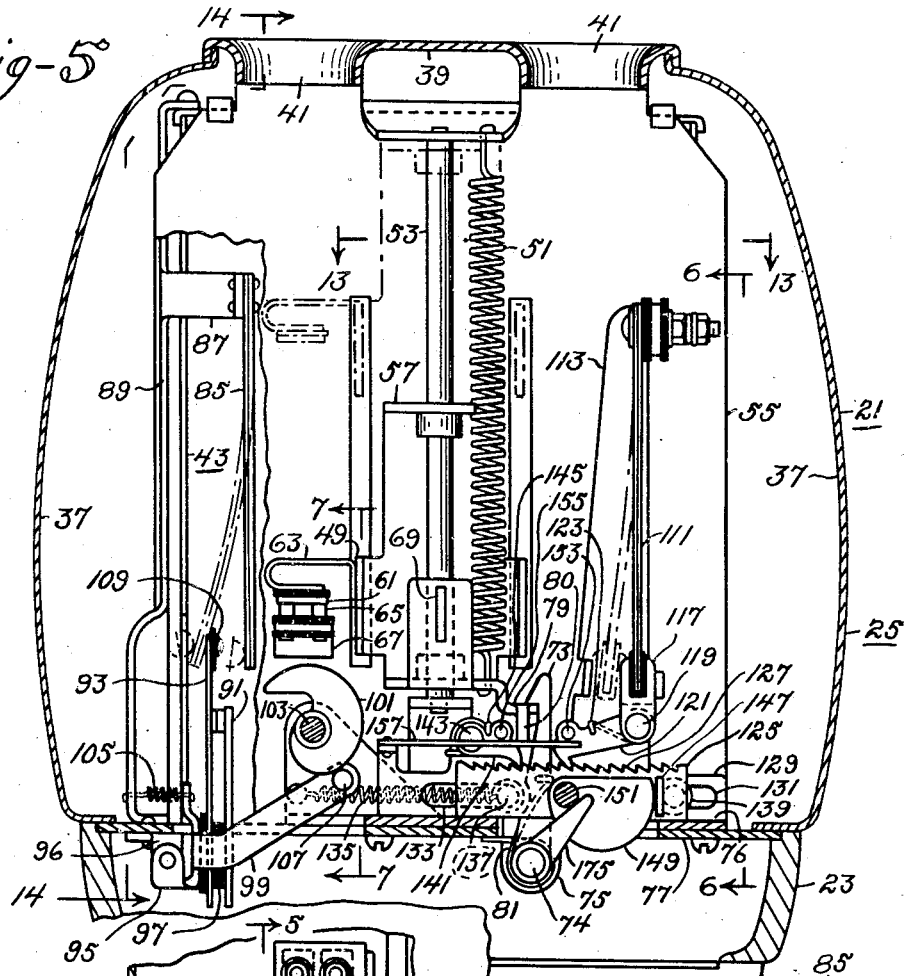
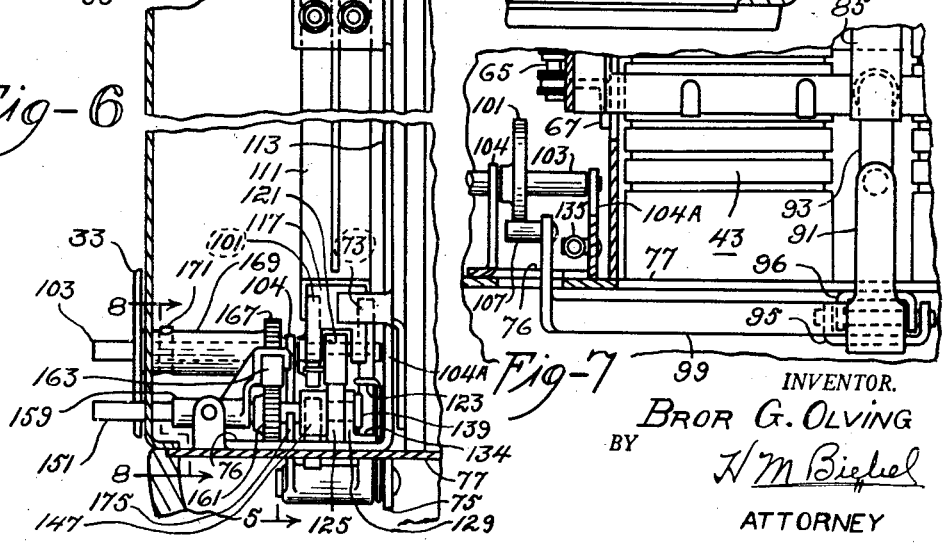
INVENTOR.
BROR G. OLVING
BY
H M Biebel
ATTORNEY

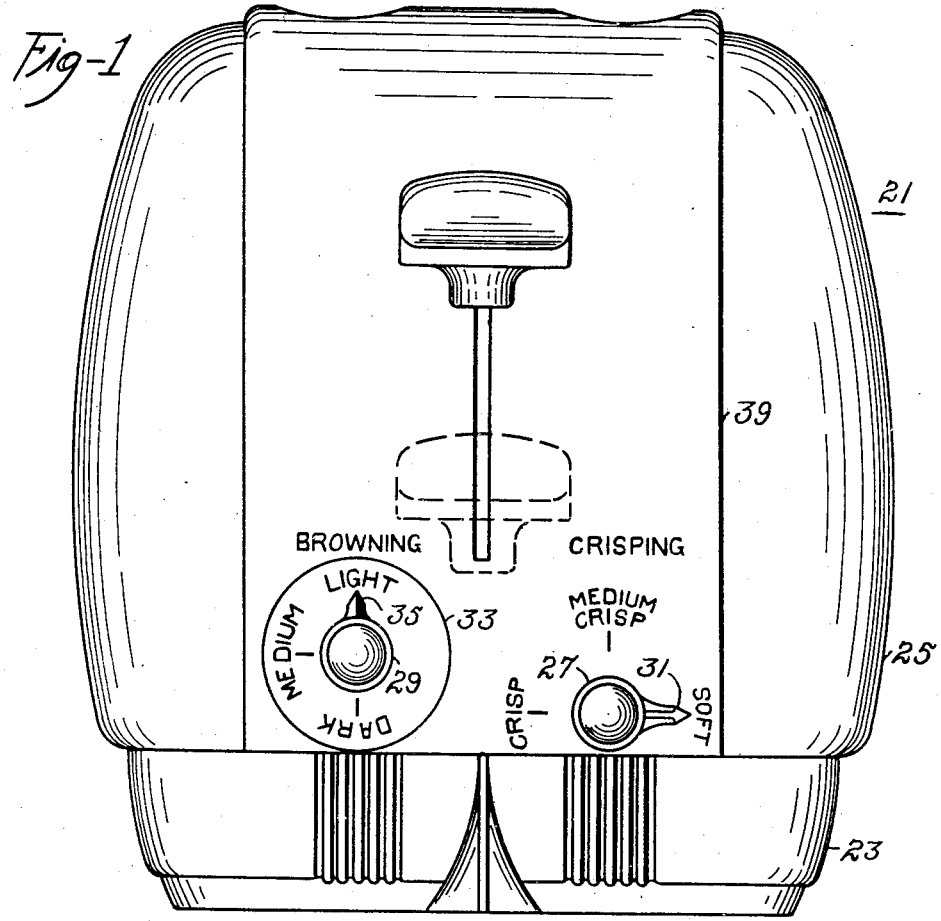
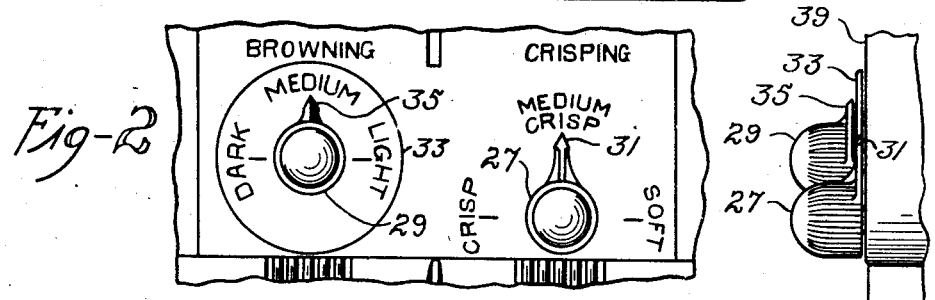
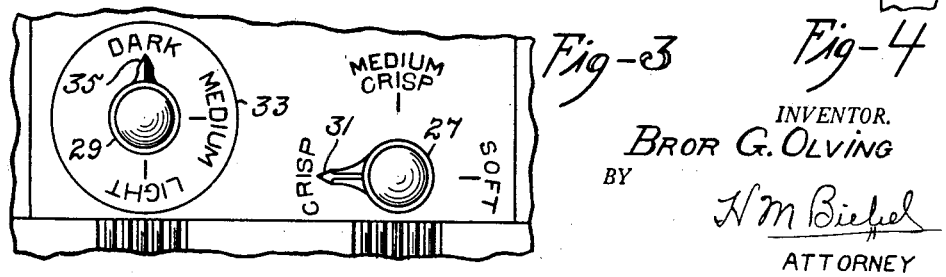

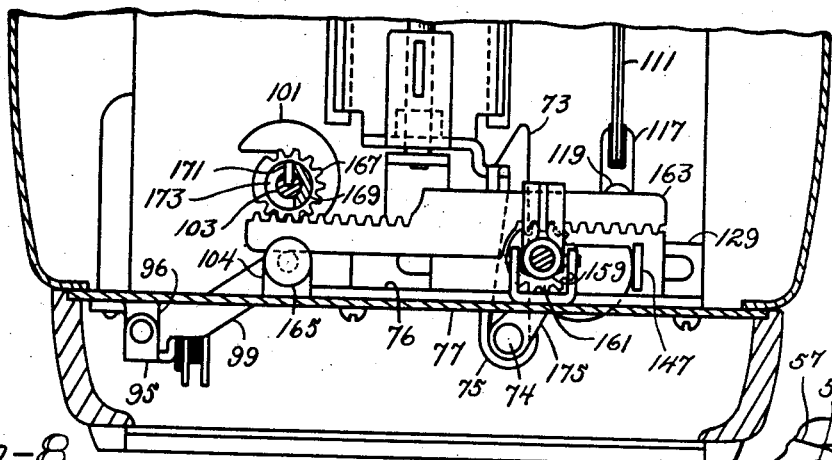
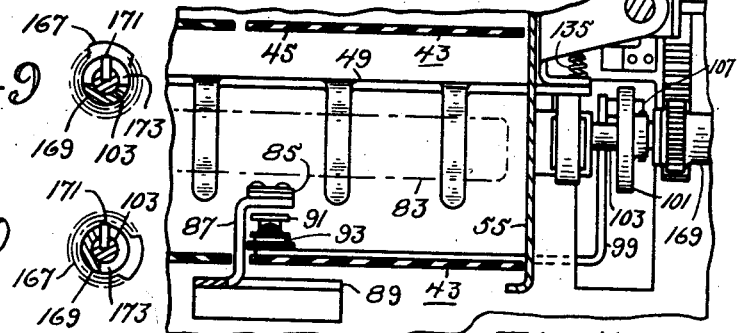
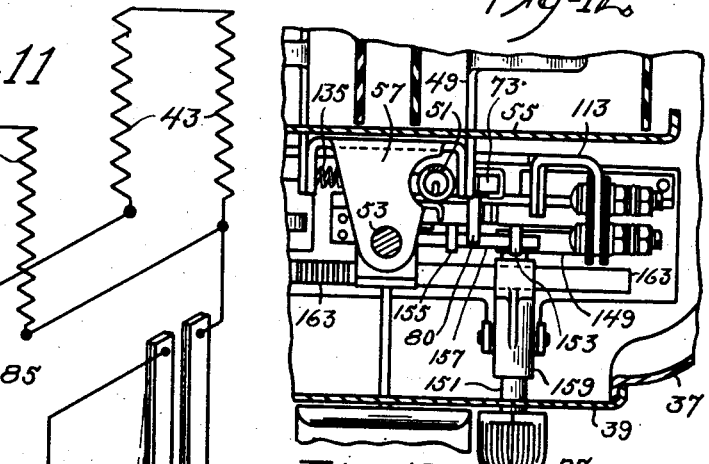

Dec. 21, 1943.  B. G. OLVING  2,337,124
AUTOMATIC ELECTRIC TOASTER
Filed Aug. 29, 1942  4 Sheets-Sheet 4

INVENTOR.
BROR G. OLVING
BY
ATTORNEY

Patented Dec. 21, 1943

2,337,124

UNITED STATES PATENT OFFICE 2,337,124

AUTOMATIC ELECTRIC TOASTER

Bror G. Olving, Elgin, Ill., assignor to McGraw Electric Company, Elgin, Ill., a corporation of Delaware Application August 29, 1942, Serial No. 456,600

8 Claims. (Cl. 219—19)

My invention relates to electric cooking devices and particularly to automatic electric toasters adapted to toast or brown a slice of bread and also to crisp or dry the slice of bread.

The main object of my invention is to provide separate control means for such a toaster having associated therewith graduations or indicia to indicate to a user the different degree of browning obtained with the toaster when changing the degree of crisping effected by the toaster.

Other objects of my invention will either be pointed out during the course of the description of a toaster embodying my invention or will be evident therefrom without further reference thereto.

In the drawings,

Figure 1 is a front elevational view of a toaster having embodied therein the mechanism embodying my invention, Fig. 2 is a fragmentary view similar to that of Fig. 1 but showing mainly the control means set in different positions, Fig. 3 is a fragmentary view similar to Fig. 2 but showing different control settings.

Fig. 4 is a fragmentary side elevational view of the parts shown in Fig. 2,

Figures 14, 15:
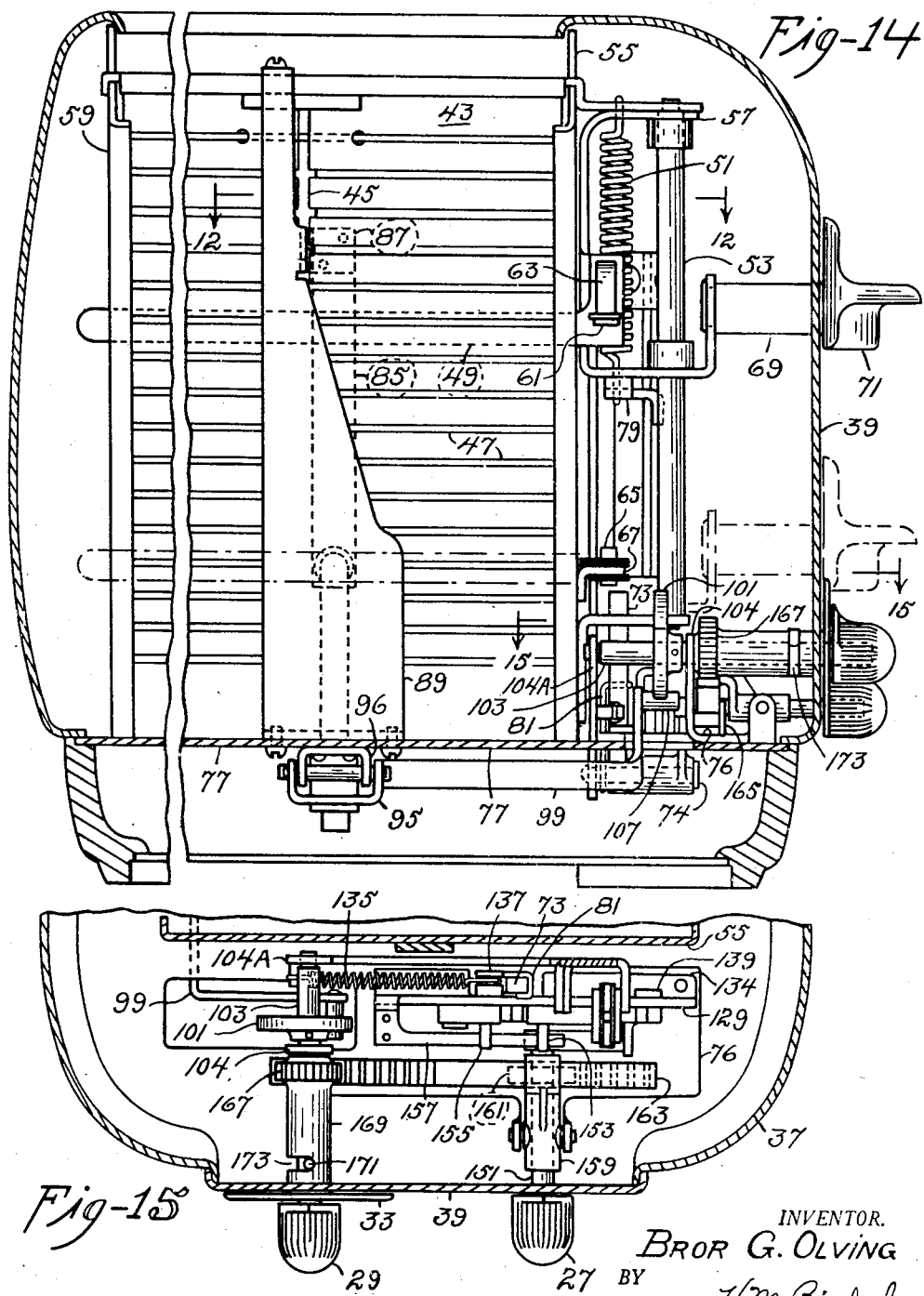

Fig. 5 is a vertical lateral sectional view through the toaster taken on the line 5—5 of Fig. 6, Fig. 6 is a vertical fragmentary sectional view taken on the line 6—6 of Fig. 5, Fig. 7 is a fragmentary view, in side elevation, taken on the line 7—7 of Fig. 5, Fig. 8 is a fragmentary vertical sectional view taken on the line 8—8 of Fig. 6, Fig. 9 is a fragmentary sectional view of certain parts shown in Fig. 8, but illustrated in a slightly different position, Fig. 10 is a fragmentary sectional view similar to Fig. 9 but showing the parts in slightly different position, Fig. 11 is a diagram of the electric circuit connections for the toaster, these parts being shown in inoperative or non-toasting positions, Fig. 12 is a fragmentary sectional view taken on the line 12—12 of Fig. 14, Fig. 13 is a fragmentary sectional view taken on the line 13—13 of Fig. 5, Fig. 14 is a vertical sectional view taken on the line 14—14 of Fig. 5, and, Fig. 15 is a fragmentary horizontal sectional view taken on the line 15—15 of Fig. 14.

As stated above, my invention relates particularly to dual-purpose automatic electric toasters which are effective to cause changes in two different physical conditions of a slice of bread subjected to heat from toast heating elements positioned within the toaster casing. The first of these physical conditions is that of toasting or browning the surfaces of a slice of bread and the second of these physical conditions is that of crisping or drying the slice of bread. The browning or toasting effect is applied to substantially only the surfaces, namely, the sides of a slice of bread but the crisping or drying thereof is effective throughout substantially all of the thickness of a slice of bread. The toasting operation usually results in a slice of bread having a browned or toasted very thin outer surface portion only so that the center or inner portion of the slice of bread may still be in substantially its initial condition. The crisping or drying effect, however, results in causing a browning or toasting effect throughout substantially the entire thickness of a slice of bread and the resultant slice of bread is fragile and may be easily broken or crumbled if desired.

I have found that when a single toast heating means, such as electric heating units are provided, and the browning and the crisping effects are obtained either simultaneously or in sequence, an increase in the degree of browning or toasting effected when a thermal timer is used, has no effect or does not change the degree of crisping or drying of the same slice of bread. However, in such a toaster a change in the degree of crisping or drying called for by the operator who presets a control knob does have an effect upon the degree of browning or toasting obtained.

This is due to the method used in an automatic electric toaster of this kind where the length of time during which a slice of bread is subjected to toasting heat is controlled by a thermal means so that the temperature of the toasting chamber caused by electric heating elements increases from start to finish of a toasting operation. In order to subject the same slice of bread to a crisping effect of the same heating units for a preset length of time, a toaster of this kind provides a thermally actuable timing means so designed and constructed that the toast heating elements are sequentially energized and deenergized, as controlled by a second thermal element, the number of times of such alternate energization and deenergization being manually adjustable for a preset length of time or, more particularly, for preset degrees of crisping or drying.

In order to be able to describe the degrees of these respective effects, I will use the words "soft,"

"medium crisp" and "crisp" for the three degrees of increasing crispness or dryness. Referring to the different degrees of browning or toasting, I have selected the words "light," "medium" and "dark" for three increasing degrees of browning or toasting.

Referring now to Fig. 1 of the drawings, I have there illustrated a two-slice toaster designated in its entirety by the numeral 21 and comprising a moulded bottom skeleton frame 23 and an outer casing 25 suitably secured to the upper surface portion of frame 23 in any suitable or desired manner. I may here point out that the details of the toaster structure other than those embodying my invention are shown for illustrative purposes only and my invention is not to be considered as being limited to these respective details since they may be applied to other forms of automatic electric toasters effective to obtain the same general result.

As has already been stated, my invention applies particularly to dual-purpose toasters effective to cause crisping or drying of a slice of bread, if desired, in addition to browning or toasting the same and I provide two control knobs 27 and 29 respectively, to control the degree of crisping and of browning obtained with the toaster. The control knob 27 is provided with a pointer 31, which pointer is adapted to cooperate with and point to one of the three indicia or graduations, "soft," "medium crisp" and "crisp" which are provided on either the outer surface of the front portion of the casing 25 or may be provided on a plate or dial, it being understood that the crisping indications are fixed on or relative to the casing.

The above mentioned graduations, "light," "medium" and "dark" for the browning control are adapted to be mounted on a rotatable disc 33 concentric with the knob 29, which knob it is to be noted may be turned by an operator and which has a pointer 35 thereon cooperating with the three indicia. The details of construction of these parts will be referred to in due course hereinafter.

First I will refer in general to the indications and toasting adjustments which can be obtained by the manipulation of knobs 27 and 29, and the interrelationship between them, as shown in Figs. 1 to 4 of the drawings.

Referring to Fig. 1, the crisping pointer 31 indicates the indicia "soft" while the browning pointer 35 indicates "light." At these control settings there will be produced light brown toast having no appreciable crisping. If the crisping knob 27 is turned counterclockwise so that pointer 31 indicates "medium crisp," as shown in Fig. 2, it will be noted that the disc 33 with its indicia has moved clockwise to bring the indicia "medium" to the pointer 35, the knob 29 not having been moved. At this adjustment there will be produced medium brown toast having a medium crisping.

It may be noted that the movement of knob 27 and pointer 31 do not affect the position of pointer 35, the disc 33 only being moved in order to change the position of the indicia on it, in relation to pointer 35, this in accordance with the condition as referred to hereinbefore, that a change in degree of crisping will effect a change in degree of browning. The functions as described above are to give an indication, to the operator, of the degree of change in browning effected with a change of crisping as indicated by the position of pointers 31 and 35.

The pointer 35, Fig. 2, may be turned to the indicia "light" without changing the position of knob 27 or pointer 31, under which conditions light brown toast having a medium crispness will be produced. Conversely, the pointer 35 may be moved to the indicia "dark" without changing the position of pointer 31, under which conditions dark brown toast having a medium crispness will be produced.

Referring to Fig. 3, the crisping control knob 27 has been further moved to bring pointer 31 to the indicia "crisp" and disc 33 has been turned so that indicia "dark" is over the pointer 35, thus indicating that dark brown toast having a maximum degree of crisping will be produced. The browning control pointer 35 as shown in Fig. 3 may be moved clockwise to the indicia "medium" or to the indicia "light" without changing the position of the crisping control pointer 31.

From the above it is evident that in a toaster embodying my invention an operator is made aware not only of the fact that there is a difference in the degree of browning, but also to the extent of this difference, when a change in degree of crisping is effected by the crisping control knob. The control mechanism has a flexibility permitting of manipulation of the control knobs whereby an operator may adjust the controls so that toast having any degree of browning with any degree of crispness can be produced.

Referring now to Figs. 5 to 15 of the drawings, the outer casing 25 may comprise two side plates 37 and a central casing portion 39 of inverted U-shape, all as now well known in the art. The top central part of portion 39 is provided with two longitudinally extending openings 41 through which slices of bread may be inserted into the toasting chambers therebelow and be removed therefrom when heat treated. I provide further four planar flat, vertically extending heating elements 43 and for illustrative purposes I have shown these as including plate or plates 45 of mica having a resistor strip 47 wound thereon, all in a manner well known in the art. I have shown four heating elements 43 for a two-slice toaster and it is to be understood that a pair of such heating units are positioned a given distance apart to permit of locating a slice of bread between each such par, the slices of bread being supported by a bread carrier 49. This bread carrier is adapted to move vertically up and down in the toasting chamber and is biased into its upper non-toasting position by a spring 51, all in a manner well known in the art.

In order to permit of moving one or the two bread carriers 49 upwardly or downwardly, I provide a vertical standard 53 in front of a front intermediate wall 55 of the toaster having a carriage plate 57 movable on the vertical standard itself. The carriage plate 57 has side portions to which the front end portions of the bread carriers are secured, all in a manner well known in the art. A rear intermediate plate 59 is provided having one or more slots through which the rear end portions of the bread carriers extend to keep them properly alined relatively to the pair of spaced toast heating elements.

Since it is desired to normally deenergize the toast heating elements hereinbefore described, I provide a main heater control switch comprising a contact bridging member 61 insulatedly supported by a resilient bracket 63 connected with the carriage plate 57, the contact bridging member 61 being adapted to engage with or be disengaged from two stationary contact members 65 insulatedly mounted on a small bracket 67 secured to the front intermediate wall 55. The carriage 57 has secured thereto a forwardly extending bar 69 adapted to move in a slot in the front vertical wall of portion 39 and has a knob 71 mounted thereon outside of the casing so that an operator can press downwardly on the knob and cause downward movement of the bread carriers in a manner well known in the art. Since it is desired to hold the bread carriers in their lowered toasting position for a given or preset length of time, I provide a pivot arm 73 extending in a substantially vertical direction being pivotally mounted on a shaft 74 supported by a small bracket 75 secured against the lower surface of a plate 76, which plate is secured against the upper surface of a bottom plate 77 (see Fig. 5). The upper end of arm 73 is provided with a hook which is adapted to engage over a lateral projection 79 constituting a lower part of the carriage 57. The outer end of extension 79 is adapted to engage against the wedge-shaped surface of one side of arm 73 at its upper end to cause it to move against the action of a biasing spring 81 associated with arm 73 until extension 79 engages in the recess of the hook-shaped end as shown in Fig. 5 of the drawings.

I provide thermal timing means for determining the length of time during which a slice of bread 83 (see Fig. 12) is subjected to heat from the toast heating elements, and this timing means may comprise a bimetal bar 85 positioned in one of the two toasting chambers of a two-piece toaster supported by its upper end which is secured to a projection 87 constituting a part of a vertically-extending bracket member 89. This bracket member may extend substantially vertically of the space between one of the outside toast heating elements and one of the side walls 37 of the casing, substantially as shown in Fig. 5 of the drawings, having its upper and lower ends connected to integral parts of the toaster structure. The bracket 89 may have its lower end secured as by rivets, to bottom plate 77. (See Figs. 5 and 14.)

An auxiliary heater control switch for the toast heating elements 43 comprises a substantially rigid contact arm 91 and a cooperable resilient contact arm 93 which are insulatedly mounted on a supporting bracket 95 (see Fig. 7) which bracket pivotally supports the two contact bars 91 and 93 so that the positions of these two bars may be changed relatively to the flexing end of the bimetal bar 85 which, as will be seen by reference to Fig. 5, is the lower end of the bimetal bar. Bracket 95 is pivotally supported by a bearing 96 secured against the lower surface of bottom plate 77. I have illustrated, in Fig. 5 of the drawings, the heated-up or flexed position of the bimetal bar by the broken lines, from which it will be noted that when the bimetal bar 85 has been subjected to heat for a predetermined length of time in a toasting chamber and has been heated to a predetermined temperature, it will flex in a clockwise direction (as seen in Fig. 5) to cause disengagement of resilient arm 93 from rigid arm 91 and thereby interrupt the flow of current through the toaster.

As is now well known in the art, a bimetal bar or, speaking more generally, a thermal element will operate as a timer when it is subjected to heat and it is, of course, possible to predetermine the temperature of the thermal element at which it will cause the desired result, which latter is, in this case, the disengagement of contact bars 93 and 91.

In order to vary the temperature and therefore the length of time during which a slice of bread is subjected to the browning or toasting operation, the supporting means for the contact arms 91 and 93 which includes a block 97 of electric insulating material, has secured thereto or integral therewith, an arm 99 of substantially L-shape, which is adapted to engage with a cam 101 fixedly mounted on and turnable with a manually adjustable shaft 103, this shaft being supported in suitable bearing members 104 and 104—A extending upwardly from plate 76 (see particularly Fig. 7). A small coil spring 105 is operatively connected with the pivotally mounted bracket 95 and tends to bias a pin 107 on arm 99 against the surface of cam member 101, all as shown particularly in Fig. 5 of the drawings. It is, therefore, to be understood that a turning movement of knob 29 and therefore of the shaft 103 with the cam 101 fixedly mounted thereon, in a counter-clockwise direction, will cause movement of the contact bars 91 and 93 in a counter-clockwise direction so that the initial distance between a lug 109, of electric-insulating material, on the outer end of contact arm 93, from the initial position of bimetal bar 85 will be increased, so that the bimetal bar 85 must be subjected to the temperature of the toasting chamber or of the toast heating elements for a longer time before the main heaters will be deenergized by the disengagement of contact arms 91 and 93 by the flexed bimetal bar 85. It is further evident that such counter-clockwise turning movement of knob 29 will cause the pointer 35 to move say from the indicia "light" to the indicia "medium" and it is, of course, to be understood that the changes in the setting of the control means effected by such turning movement of the knob will agree with the final degree of toasting to be obtained in the use of such a toaster.

The degree of crisping or drying of the slice of bread is controlled by a second thermal element here shown as a bimetal bar 111 of substantially U-shape having its upper ends insulatedly supported on a bracket 113 which extends substantially vertically in the front mechanism chamber of the toaster and being secured to horizontal plate 76. The bimetal bar 111 being positioned outside of the toasting chamber is not affected by the temperature within the chamber; however, the temperature for flexing bar 111 is produced within itself by electrically connecting bar 111 in series circuit with the toast heating element 43, as shown in Fig. 11, the design, construction and arrangement of the bimetal bar being such that when heated it will flex in a clockwise direction as indicated by broken lines in Fig. 5.

As has already been hereinbefore stated, the main timer control bimetal bar 85 is effective to interrupt the circuit through the toast heating elements when the temperature of the toasting chamber or chambers reaches a given or preset value and this also interrupts the circuit through the bimetal bar 111 which then cools and unflexes to the position shown in full lines in Fig. 5. The flexing and unflexing of bar 111 as seen in Fig. 5 is for a purpose now to be described.

The lower or free end of bar 111 has insulatedly mounted thereon a member 117 adapted to support a pivot pin 119, which pin pivotally supports a pawl 121 which is biased, by a small spring 123, in a counter-clockwise direction.

A ratchet bar 125 having teeth 127 in its upper edge, is adapted to be engaged by the hook end of pawl 121 (as seen particularly in Fig. 5), so that as the bimetal bar 111 flexes it will move the pawl from one ratchet tooth 127 into another ratchet tooth to the left thereof as seen in Fig. 5 of the drawings, and when the bimetal bar 111 cools because of the deenergization of the toast heating elements, as hereinbefore described, the cooling bimetal bar 111 will move the ratchet bar in a right-hand direction. A bar or plate 129 having a pair of elongated slots 131 and 133 therein has a bottom horizontally-extending portion 134 by means of which it is fixed on plate 76 and the ratchet bar 125 is biased in a left-hand direction by a coil spring 135 connected to a pin 137 fixed in bar 125 and moving in slot 133. A second pin 139 fixed in bar 125 moves in slot 131.

I provide a stop ratchet 141 pivotally mounted on a fixed pivot pin 143, the pawl 141 being biased into engagement with the ratchet teeth 127 by a spring 145. As the bimetal bar 111 is first heated up and flexed in a clockwise direction (as seen in Fig. 5) and is then cooled, it will cause movement of the ratchet bar 125 toward the right. This will also, as is evident, cause movement of the pin 137 toward the right, this pin being alined with the intermediate part of the detent arm 73 so that upon sufficient movement of ratchet bar 125 in the right-hand direction, pin 137 will engage the mid portion of arm 73 causing it to move on its pivotal support in a clockwise direction to thereby be disengaged from the projection 79 whereby quick upward movement of the bread carriers and the carriage 57 is permitted. It is obvious that when ratchet bar 125 is adjusted to the extreme left the pin 137 will travel a greater ditsance before contacting detent arm 73 than when the ratchet bar 125 is adjusted to the extreme right, thus causing a longer or shorter time period of energization of the toast-heating elements before the bread carrier carriage 57 is released from the detent 73 to terminate a toasting operation.

The ratchet bar 125 may be manually adjusted, and to this effect a lug 147 (see Fig. 5) is provided near the right-hand end thereof adapted to be biased by spring 135 into engagement with the surface of a cam 149, which cam is fixedly supported on a shaft 151. It is obvious that turning movement of shaft 151 and cam 149 mounted thereon in conjunction with spring 135 will cause right or left-hand movement of ratchet bar 125 so that the pawl 121 will engage with a predetermined ratchet tooth 127. Thus if the shaft 151 is in the position shown in Fig. 5 of the drawings, the bar 125 will be in almost its extreme right-hand position so that movement of the bimetal bar 111 through only one cycle may be sufficient to cause termination of the crisping operation. If, however, the cam 149 is turned in a counter-clockwise direction, the ratchet bar 125 and the pin 132 fixed therein will be farther toward the left so that a greater number of cycles of heat-up cool-off and therefore flexing and unflexing of the bimetal bar 111 will be necessary before pin 132 engages arm 73 and turns it to a disengaging position relatively to extension 79. The pawls 121 and 141 are normally in engagement with the teeth 127 of ratchet bar 125 when the bread carrier carriage 57 is in the lower or toasting position as shown in Fig. 5 but are out of engagement with teeth 127 when carriers are in the upper or non-toasting position.

With the parts as shown in Fig. 5, a flexing and unflexing cycle of bimetal bar 111, as stated above, will effect a right-hand movement of ratchet bar 125 with a consequent movement of stop lug 147 out of engagement with cam surface 149. The pawl 141 will prevent a left-hand movement of the ratchet bar 125, under the influence of the spring 135, during subsequent flexing cycles of bimetal bar 111 to release the detent 73.

Pawls 121 and 141 are provided with laterally extending pins 153 and 155 normally engaged by a spring bar 157 fixedly mounted at its left-hand end and effective to cause slight upward movements of the respective ends of pawls 121 and 141 out of engagement with the ratchet teeth 127.

When the parts are in position as shown in Fig. 5, the spring bar 157 is held out of engagement with the pins 153 and 155 by a downward projecting portion 80 of projection 79. When the carriage 57 is released to assume its upper position, the portion 80 releases the spring 157 to contact the pins 153 and 155. The spring tension of spring 157 is sufficient to overcome the effect of biasing springs 145 and 123 thus raising the pawls 141 and 121 up out of engagement with ratchet teeth 127, which permits the biasing spring 135 to return the ratchet bar 125 to its previous left-hand position and the lug 147 to engagement with the cam surface 149.

Shaft 151 is pivotally supported as by a tubular bearing member 159 (see Figs. 8 and 13), the knob 27 being mounted on the shaft 151 outside of the front center casing portion 39. Shaft 151 has fixedly mounted thereon a pinion 161 which engages with lower teeth at the right-hand end of a rack bar 163. The rack bar therefore rests on pinion 161 while the left-hand end of rack bar 163 is supported by a roller 165 suitably supported as on the plate 76. The upper edge of the left-hand end of rack bar 163 is provided with teeth and engages a pinion 167 which is a part of an outer tubular member 169 rotatably mounted on shaft 103 which supports cam 101, the indicator disc 33 being fixedly mounted on member 169 on the outside of and in front of the vertical front wall of center casing portion 39.

The tubular member 169 mounted on the shaft 103 has a lost-motion connection with that shaft provided by a pin 171 fixed in the shaft and adapted to move in a substantially semi-circular slot 173, as shown more particularly in Figs. 8, 9, 10, 14 and 15 of the drawings.

This lost-motion connection between the tubular member 169 and the shaft 103 is necessary in order to permit of the operator selecting three different degrees of crisping or of drying of the bread with a selected degree of browning or toasting of the bread. Thus it is evident that a user might desire "light" toast of either "soft," "medium crisp" or "crisp" degree of drying while another user might desire "medium" or "dark" toast with any one of the different degrees of crisping. As has already been hereinbefore stated, the degree of browning has no appreciable effect upon the degree of crisping but the degree of crisping does have a very decided effect upon the degree of browning or toasting since crisping is effected by application for a prolonged period of time of substantially the same degree of heat to which the slice of bread was subjected to obtain a preset degree of browning or toasting. Figs. 9 and 10 show the other two positions of the parts particularly associated with the browning control, as will be evident. The positions of pin 171 and slot 173 as shown in Fig. 8 correspond to the position of disc 33 in Fig. 1 whereas Fig. 9 shows the position of slot and pin corresponding with the position of disc 33 as shown in Fig. 2 and Fig. 10 shows the positions corresponding to that of disc 33 as shown in Fig. 3.

When it is desired to inspect the toasting progress during a toasting period or to manually terminate a toasting period, the following means are provided. The crisping control means includes another element associated with the pivotal mounting of member 159 and of shaft 151, it being remembered that crisping control cam 149 is mounted on the inner end of shaft 151. The shaft supporting the arm 73 of the detent member has mounted thereon an arm 175 (see Fig. 5) which is normally positioned closely to or immediately adjacent to the shaft 151 and it is therefore only necessary to effect an upward movement of knob 27 to effect a slight downward movement of the shaft 151 where it is closely adjacent to or in engagement with arm 175 whereby a clockwise turning movement of detent arm 73 on shaft 74 will be effected to permit of quick upward movement of the carriage plate 57 and of the bread carriers 49 to terminate the heat-treating operation of a slice or slices of bread in such a toaster.

While I have illustrated and described specific embodiments of the various detailed devices constituting my invention, it is obvious that my invention is not limited to such details but may be embodied in other similarly operative devices so long as these operate in substantially the same manner and for substantially the same purpose.

Various modifications may be made in the structures embodying my invention and I desire that all such modifications coming within the scope of the appended claims shall be considered as being covered thereby.

I claim as my invention:

1. In an automatic electric toaster comprising toast heating elements and a plurality of control means for said toast heating elements adapted to preset the degree of a plurality of different physical conditions reached by a slice of bread subject to said heating elements, a change in the degree of one of said physical conditions effecting a change in the degree of the other physical condition, a plurality of sets of indicia indicating the degrees of the respective physical conditions and mechanical means to cause a change in the setting of one control means to indicate the altered degree of the other physical condition.

2. In an automatic electric toaster comprising toast heating elements, a first control means for said toast heating elements to preset the degree of a first physical condition reached by a slice of bread subject to said toast heating elements, a second control means for said toast heating elements to preset the degree of a second physical condition reached by a slice of bread subject to said toast heating elements, a change in the degree of one of said physical conditions effecting a change in the degree of the second physical condition, two sets of indicia cooperating with the respective first and second control means to indicate the degrees of the respective first and second physical conditions and mechanical means interconnecting said first control means and the indicia of said second control means to cause a change in the setting of said first control means to indicate the changed degree of the other physical condition.

3. In an automatic electric toaster comprising toast heating elements, a first control means for said heating elements to preset the degree of crisping reached by a slice of bread subject to said heating elements, a second control means for said heating elements to preset the degree of toasting or browning reached by a slice of bread subject to said heating elements, a change in the degree of crisping effecting a change in the degree of browning of a slice of bread, a first and a second set of indicia for the respective browning and crisping control means to indicate the degrees of browning and of crisping effected by the heating elements and means mechanically interconnecting the crisping control means and the indicia for the browning control means to cause a change in the setting of the crisping control means to indicate the changed degree of the browning effect.

4. In an automatic electric toaster comprising toast heating elements, a first control means for said heating elements to preset the degree of crisping reached by a slice of bread subject to said heating elements, a second control means for said heating elements to preset the degree of browning reached by a slice of bread subject to said heating elements, an increase in the degree of crisping effecting an increase in the degree of browning of a slice of bread, a first and a second set of indicia for the respective browning and crisping control means to indicate the degree of browning and of crisping effected by the heating elements and means including a rack bar interconnecting the crisping control means and the indicia for the browning control means to cause a change in the setting of the crisping control means calling for an increase in crisping of a slice of bread to indicate the resultant increase in the degree of browning.

5. In an automatic electric toaster comprising toast heating elements, a first control means for said heating elements to preset the degree of crisping reached by a slice of bread subject to said heating elements, a second control means for said heating elements to preset the degree of browning reached by a slice of bread subject to said heating elements, a decrease in the degree of crisping effecting a decrease in the degree of browning of a slice of bread, a first and a second set of indicia for the respective browning and crisping control means to indicate the degree of browning and of crisping effected by the heating elements and means including a rack bar interconnecting the crisping control means and the indicia for the browning control means to cause a change in the setting of the crisping control means calling for a decrease in crisping of a slice of bread to indicate the resultant decrease in the degree of browning.

6. In an automatic electric toaster comprising toast heating elements, a first and a second thermal control means for said heating elements for respectively controlling the degree of browning and crisping of a slice of bread subject to said heating elements, the degree of crisping being unaffected by a change in the degree of browning and the degree of browning being effected by a change in the degree of crisping, a first manually-actuable control knob adapted to preset the first named control means and having a pointer thereon, movable indicia cooperating with said pointer to indicate the degree of browning, a second manually-actuable control knob adapted to preset the second control means and having a pointer thereon, fixed indicia cooperating with the pointer on said second control means to indicate the degree of crisping, pinions movable respectively with said movable indicia and said second control knob and a rack bar engaging said pinions and adapted to indicate the new degree of browning of a slice of bread effected by a new setting of the control knob of the crisping control means.

7. In an automatic electric toaster comprising toast heating elements, a first and a second thermal control means for said heating elements adapted to control respectively the degree of browning and of crisping of a slice of bread subject to said heating elements, the degree of browning being affected by the degree of crisping, a first and a second manually-actuable control knob to preset respectively the first and the second control means, graduation marks movable relatively to the browning control knob and adapted to indicate the degree of browning to be obtained with a predetermined setting of the browning control knob and mechanical means connecting the crisping control means and the movable graduation marks to indicate the change in the degree of browning effected by a change in the degree of crisping.

8. In an automatic electric toaster comprising toast heating elements, a first and a second thermal control means for said heating elements adapted to control respectively the degree of browning and of crisping of a slice of bread subject to said heating elements, the degree of browning being increased by an increase in the degree of crisping, a first and a second manually-actuable control knob to preset respectively the first and the second control means, graduation marks movable relatively to the browning control knob and adapted to indicate the degree of browning to be obtained with a predetermined setting of the browning control knob and mechanical means connecting the crisping control means and the movable graduation marks to indicate the increase in the degree of browning effected by an increase in the degree of crisping.

BROR G. OLVING.